(12) United States Patent
Hitchin

(10) Patent No.: US 7,061,629 B2
(45) Date of Patent: Jun. 13, 2006

(54) CUSTOMIZED FORM OUTPUT APPARATUS AND METHOD

(75) Inventor: Trevor D. Hitchin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 883 days.

(21) Appl. No.: 09/918,689

(22) Filed: Jul. 30, 2001

(65) Prior Publication Data

US 2003/0020955 A1  Jan. 30, 2003

(51) Int. Cl.
*G06F 13/00* (2006.01)
*G06F 15/00* (2006.01)

(52) U.S. Cl. ...................... 358/1.1; 358/1.18
(58) Field of Classification Search ............... 358/1.6, 358/1.18, 1.1; 705/401; 709/108
See application file for complete search history.

(56) References Cited

U.S. PATENT DOCUMENTS

| | | | | |
|---|---|---|---|---|
| 5,249,103 A | * | 9/1993 | Forsythe | ...................... 361/730 |
| 5,544,040 A | * | 8/1996 | Gerbaulet | ...................... 705/26 |
| 5,748,511 A | * | 5/1998 | Mansutti et al. | ............ 708/109 |
| 5,995,942 A | * | 11/1999 | Smith et al. | ................... 705/14 |
| 6,158,906 A | * | 12/2000 | Simon et al. | ................. 400/88 |
| 6,362,897 B1 | * | 3/2002 | Berg et al. | .................... 358/1.6 |
| 6,429,892 B1 | * | 8/2002 | Parker | ........................ 348/77 |
| 6,657,607 B1 | * | 12/2003 | Evanicky et al. | ............. 345/88 |
| 2002/0046195 A1 | * | 4/2002 | Martin et al. | ............... 705/401 |
| 2003/0197894 A1 | * | 10/2003 | Miyamoto et al. | ......... 358/1.18 |

* cited by examiner

*Primary Examiner*—Edward Coles
*Assistant Examiner*—Alan Rahimi

(57) ABSTRACT

In a unitary business machine with a top, bottom, front, back and two sides, a customized form output apparatus includes an electronic data storage device for storing preselected customized forms. A display is connected to the data storage device for displaying stored forms. A selector is connected to the data storage device for selecting forms from the display and an integral hard copy printer is connected to the data storage device for printing a hard copy of the forms as selected. In one aspect of the invention, the apparatus includes a wall mount connected to the back for mounting the apparatus on a wall. In further aspects of the invention, the display is a flat panel display and the selector is a touch screen overlaying the display.

19 Claims, 1 Drawing Sheet

CUSTOMIZED FORM OUTPUT APPARATUS AND METHOD

FIELD OF THE INVENTION

This invention relates to a customized form output apparatus and method. In particular, the invention relates to a customized form output apparatus and method in a unitary business machine whereby multiple users have easy access to preselected customized forms on demand.

BACKGROUND OF THE INVENTION

Forms are created to simplify repetitive tasks encountered by businesses and individuals. In fact, the use of forms to collect data is a favored method of data collection by businesses since the use of a form ensures the collection of like data from multiple users. With the advent of computers, businesses throughout the world have customized forms to fit their particular needs and to reflect their own corporate image.

Businesses that utilize forms historically have had to run a balancing act between stockpiling enough forms to satisfy present demand and anticipated near-term demand without creating such a large inventory that the inventory is exposed to risk of obsolescence should the company decide to change the form. Here again, businesses have found computers useful in limiting the amount of stockpiled forms necessary to keep on hand. Also, in companies where employees each have access to computers, some companies have reduced their form inventory considerably by providing access to company forms on the computer such that the employee simply fills the form out on the computer.

These "solutions" are not perfect however in that companies can be caught off guard with short supplies of preprinted forms and not all companies are able to provide computer access to all employees. In fact, many businesses prefer not to provide computer access to employees in such a manner for a variety of privacy reasons. This is obvious since the scope of forms used in businesses ranges from simple change of address forms, to health forms, investment forms, and the like.

In short, millions of employees have no access to computers/printers and yet they still need to easily and quickly have access to job-related forms. At the same time, businesses have a need to provide current forms in quantities that nearly exactly match demand.

Thus, there is a need in the art for providing a method and apparatus that enables a user to obtain access to customized business forms in an efficient manner while at the same time providing businesses an apparatus and method for maintaining up-to-date customized business forms for use by employees.

SUMMARY OF THE INVENTION

Accordingly, the customized form output apparatus and method of the present invention includes in a unitary business machine with a top, bottom, front, back and two sides, with electronic data storage in the machine for storing preselected customized forms. A display is connected to the data storage device for displaying the stored forms. A selector is connected to the data storage device for selecting forms from the display and an integral hard copy printer is connected to the data storage device for printing a hard copy of the forms as selected.

In a further aspect of the invention, a wall mount is connected to the back of the machine for mounting the apparatus on a wall. In another aspect of the invention, the data storage is a hard drive conformed to receive electronic input for new customized forms and to store input forms. In a further aspect of the invention, the display is a flat panel display and the selector is a touch screen overlaying the display.

In further aspects of the invention, a battery is provided for providing power for operation and a selector further comprises user selections from a group including select, print, and cancel. In another aspect of the invention a paper holder is connected to the integral printer and the back of the apparatus. In another aspect of the invention, the hard copy of the selected form is dispensed from the bottom of the apparatus and paper for printing is input at the top of the apparatus.

In a further embodiment of the invention, a wall mounted print on demand form kiosk includes a unitary box with a top, bottom, front, back, and two sides. An electronic data storage device for storing customized forms in electronic form is connected to the box. A flat panel display is connected to the data storage device for displaying stored forms and a touch screen selection device is connected to the data storage device overlaying the flat panel display device for selecting forms from the display device. An integral hard copy printer device is connected to the data storage device for printing a hard copy of a form selected by a user and a power source is connected to the box.

In a further aspect of the invention, the box is conformed in size to approximately match the length and width of a sheet of letter sized or legal sized paper. In a further aspect of the invention, the box is conformed to hold fifty to one hundred sheets of paper for printing.

In a further embodiment of the invention, a method for providing customized printed forms from a wall mounted print on demand form kiosk includes the steps of constructing a unitary box with a top, bottom, front, back and two sides. A hard drive is connected to the box for storing electronic copies of customized forms and a flat panel display is connected to the hard drive for displaying stored forms. A touch screen selector is connected to the hard drive and overlays the flat panel display for selecting forms from the display. A hard copy printer is connected to the hard drive for printing a hard copy of a form as selected by a user. The box is then connected to a power source and customized forms are loaded on the hard drive. A user then selects a form to be printed and prints the form.

DESCRIPTION OF THE DRAWING

Other objects, features, and advantages of the present invention will become more fully apparent from the following detailed description of the preferred embodiment, the appended claims and the accompanying drawing in which:

DETAILED DESCRIPTION OF THE INVENTION

Figure 1:
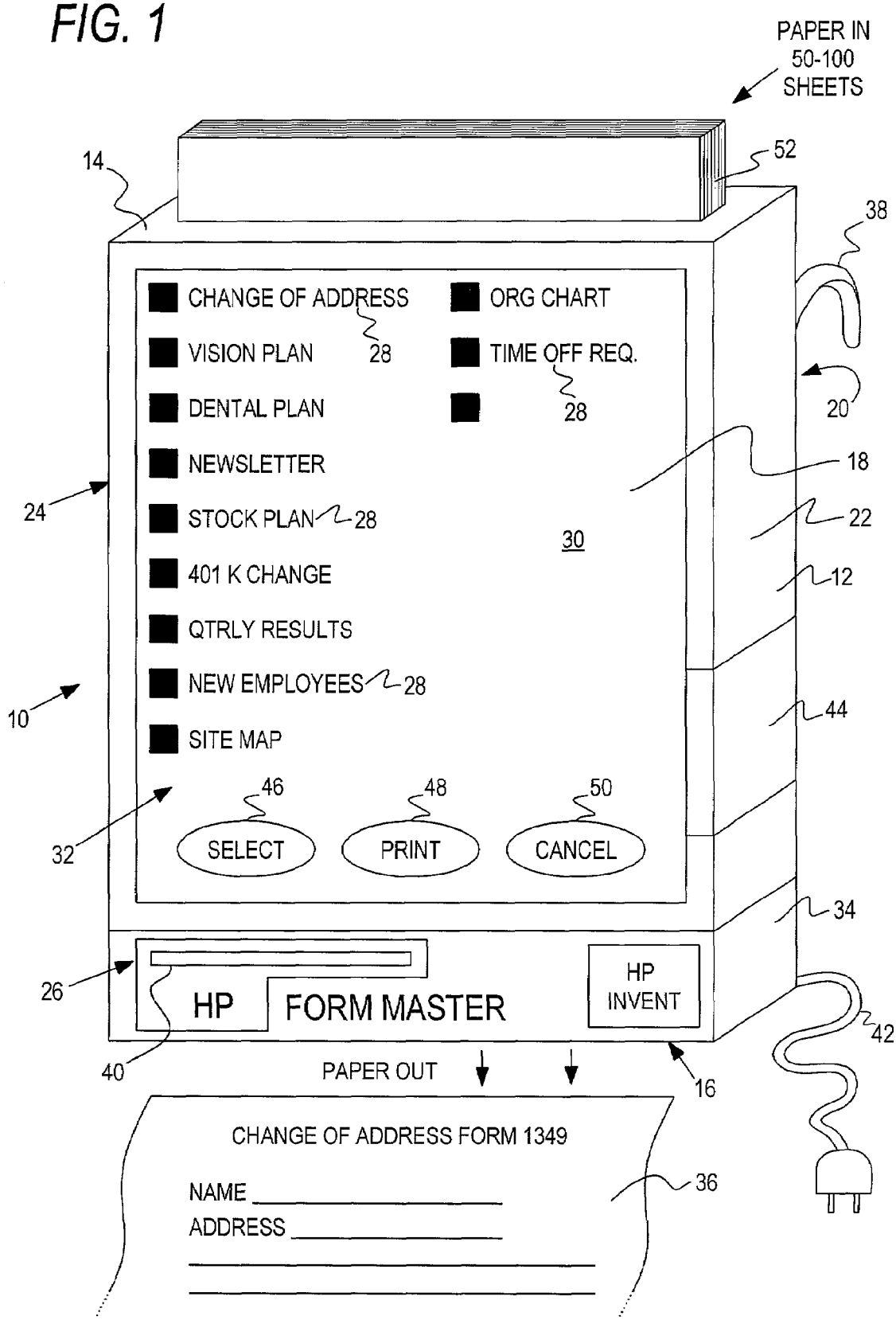
FIG. 1 is a perspective view of the customized form output apparatus of the present invention.

The preferred embodiment of the present invention is illustrated by way of example in FIG. 1. With specific reference to FIG. 1, the customized form output apparatus 10 of the present invention includes a box 12 with a top 14, bottom 16, front 18, back 20, and two sides 22 and 24. Electronic data storage 26 is connected to box 12 for storing preselected customized forms 28 in electronic form. A display 30 is connected to the electronic data storage 26 and displays a menu of stored forms, as illustrated, as well as displaying the entire form whenever a form is selected. A selector 32 is connected to the data storage 26 for selecting forms from the display 30. An integral hard copy printer 34 is connected to the data storage 26 for printing a hard copy 36 of the preselected customized forms 28 as selected.

In another preferred embodiment of the invention, a wall mount 38 is connected to the back 20 of box 12 for mounting customized form output apparatus 10 on a wall. In a further aspect of the invention electronic data storage 26 is a hard drive, as is known in the art, with an input slot 40 conformed to receive electronic input, in the form of a floppy disc or cd for example, and to store new or revised versions of the preselected customized forms 28.

In a further aspect of the invention, display 30 takes the form of a flat panel display as illustrated. Flat panel display 30 is any type of flat panel display now known or hereafter developed. Likewise, in a further aspect of the invention, selector 32 is a touch screen of any type now known or hereafter developed. In this aspect, selector 32 overlays display 30.

Power to customized form output apparatus 10 may be provided by a power cord 42 or, in a further aspect of the invention, by means of a replaceable battery 44 where no convenient power source is available.

In one aspect of the invention, selector 32 includes user selections from a group including select 46, print 48, and cancel 50. Certainly, other commands such as "number of copies" and/or notices, such as "add paper", are well within the scope of those of ordinary skill in the art. In a further aspect of the invention, a paper holder 52 is connected to printer 34 at the back 20 of customized form output apparatus 10. Still further, in a preferred embodiment of the invention, box 12 is conformed in size to approximately match the length and width of a sheet of letter sized or legal sized paper. Still further, in a preferred embodiment of the invention, selected forms are dispensed from the bottom 16 of box 12 and paper for printing is input at the top 14 of box 12 as illustrated in FIG. 1. In a further aspect of the invention, box 12 is conformed to hold fifty to one hundred sheets of paper for printing. This size is convenient since it matches typical paper ream sizes and numbers as known in the art.

In operation, customized form output apparatus 10 is placed in a suitable location where access by employees is the most convenient. Any number of customized forms 28 can be loaded on apparatus 10 and any type of form can be added as well. As illustrated in FIG. 1, such business forms include, but are not limited to, change of address, vision plan, dental plan, newsletter, stock plan, 401(k) change, quarterly results, new employees, site map, organizational chart, and time off request. Rather than keeping all of these forms in a cabinet and/or disbursing these forms throughout a business, by way of the present invention, businesses can provide easy, on demand, access to their employees to any and all customized forms 28 that a business desires.

In a preferred embodiment, customized form output apparatus 10 is attached to a wall. Preselected customized forms are loaded into the electronic data storage either before or after attaching the apparatus 10 to the wall. Thereafter, users approach the apparatus 10 and select whatever form they need from the display 30. Once selected, the user simply pushes the "print" button 48 on the touch screen 32 and the printer 34 prints out a hard copy 36 of the form 28.

Customized form output apparatus 10 finds uses for all types and shapes of corporations, governmental entities, and the like. For example, the Internal Revenue Service can utilize the apparatus 10 for printing a variety of forms at multiple locations throughout the country without need of providing preprinted forms to places where the need is later determined not to have been great. Further, customized form output apparatus 10 may be networked in a manner known in the art as opposed to operating as a stand alone device.

The description of the present embodiments of the invention have been presented for purposes of illustration, but are not intended to be exhaustive or to limit the invention to the form disclosed. Many modifications and variations will be apparent to those of ordinary skill in the art. As such, while the present invention has been disclosed in connection with the preferred embodiments thereof, it should be understood that there may be other embodiments which fall within the spirit and scope of the invention as defined by the following claims.

What is claimed is:

1. A customized form output apparatus, the apparatus comprising:
   a) electronic data storage in a unitary business machine with a top, bottom, front, back and two sides, for storing preselected customized forms;
   b) a display on said unitary business machine connected to the data storage for displaying information identifying stored forms;
   c) a selector connected on said unitary business machine connected to the data storage for selecting forms from the display; and
   d) an integral hard copy printer in said unitary business machine connected to the data storage for printing a hard copy of said forms as selected, wherein dimensions of the unitary business machine conform with approximate dimensions of a printed hard copy of one of said forms.

2. The apparatus of claim 1 further comprising a wall mount connected to the back for mounting the apparatus on a wall.

3. The apparatus of claim 1 wherein said data storage is a hard drive conformed to receive electronic input for new customized farina and to store a input forms, hard copies of stored forms having a pre-arranged format with instructions for supplying information within blank spaces provided on the hard copies of the forms.

4. The apparatus of claim 1 wherein said display is a flat panel.

5. The apparatus of claim 1 wherein said selector is a touch screen overlaying said display.

6. The apparatus of claim 1 further comprising a battery for providing power for operation.

7. The apparatus of claim 1 wherein said selector further comprises user selections from a group including select, print, and cancel.

8. The apparatus of claim 1 further comprising a paper holder connected to said integral printer and to the back of the apparatus.

9. The apparatus of claim 1 wherein said hard copy of a selected form is dispensed from the bottom of the apparatus and paper for printing is input at the top of the apparatus.

10. A wall mounted print on demand form kiosk comprising:
   a) a unitary box with a top, bottom, front, back and two sides, b) an electronic data storage means for storing customized forms in electronic form located within said unitary box;
c) a flat panel display means connected to said data storage means for displaying information identifying stored forms;
d) a touch screen selection means connected to said data storage means overlaying said flat panel display means for selecting forms from the display means;
e) an integral hard copy printer means connected to the data storage means for printing a hard copy of a form as selected by a user, wherein the unitary box is conformed in size to approximately match the length and width of a sheet of letter sized or legal sized paper; and
f) a power source connected to the unitary box.

11. The kiosk of claim 10 further comprising a paper holder connected to die printer means at the back of the unitary box.

12. The kiosk of claim 10 wherein hard copies of selected forms are dispensed from the bottom of the unitary box and paper for printing is input at the top of the unitary box.

13. The kiosk of claim 10 wherein said box is conformed to hold fifty one hundred sheets of paper for printing.

14. The kiosk of claim 10 wherein said power source is a battery.

15. The kiosk of claim 10 wherein said data storage means is a hard drive conformed to receive electronic input for new customized forms and to store input forms, hard copies of stored forms having a pre-arranged format with instructions for supplying information within blank spaces provided on the hard copies of the forms.

16. A method of providing customized printed forms from a wall mounted print on demand form kiosk comprising the steps of:

a) constructing a unitary box with a top, bottom, front, back and two sides;
b) connecting a hard drive within said unitary box for storing electronic copies of customized forms;
c) connecting a flat panel display on said unitary box and to said hard drive for displaying information identifying stored forms;
d) connecting a touch screen selector to said hard drive and overlaying said flat panel display for selecting forms from the display;
e) connecting a hard copy printer within said unitary box and to said hard drive for printing a hard copy of a form as selected by a use;
f) connecting a power source to said unitary box;
q) loading customized forms on said hard drive:
h) selecting a form to be printed: and
i) printing said form, wherein the box is the approximate size of a length and width of a sheet of paper that is used in printing the form.

17. The method of claim 16 further comprising the step of conforming the box to the approximate size of the length and width of a sheet of letter sized or legal sized paper.

18. The method of claim 16 further comprising attaching a paper holder to the back of the unitary box.

19. The method of claim 16 further comprising the step of constructing the unitary box so that hard copies of selected forms are dispensed from the bottom of the box and paper for printing is input at the top of the unitary box.

* * * * *

UNITED STATES PATENT AND TRADEMARK OFFICE
CERTIFICATE OF CORRECTION

| | | |
|---|---|---|
| PATENT NO. | : 7,061,629 B2 | Page 1 of 1 |
| APPLICATION NO. | : 09/918689 | |
| DATED | : June 13, 2006 | |
| INVENTOR(S) | : Trevor D. Hitchin | |

It is certified that error appears in the above-identified patent and that said Letters Patent is hereby corrected as shown below:

In column 4, line 24, in Claim 1, after "storage" insert -- , --.

In column 4, line 30, in Claim 1, after "selector" delete "connected".

In column 4, line 44, in Claim 3, delete "farina" and insert -- forms --, therefor.

In column 4, line 44, in Claim 3, after "store" delete "a".

In column 4, line 49, in Claim 4, after "panel" insert -- display --.

In column 4, line 66, in Claim 10, delete "back" and insert -- back, --, therefor.

In column 4, line 67, in Claim 10, delete "sides," and insert -- sides; --, therefor.

In column 5, line 18, in Claim 11, delete "die" and insert -- the --, therefor.

In column 5, line 24, in Claim 13, after "fifty" insert -- to --.

In column 6, line 15, in Claim 16, delete "use" and insert -- user --, therefor.

In column 6, line 17, in Claim 16, delete "q)" and insert -- g) --, therefor.

In column 6, line 17, in Claim 16, delete "drive:" insert -- drive; --, therefor.

In column 6, line 18, in Claim 16, delete "printed:" and insert -- printed; --, therefor.

Signed and Sealed this

Eighteenth Day of August, 2009

David J. Kappos
*Director of the United States Patent and Trademark Office*